United States Patent [19]
Coia et al.

[11] Patent Number: 6,154,032
[45] Date of Patent: Nov. 28, 2000

[54] ELECTRONIC CIRCUIT FOR IDENTIFYING CIRCUIT BREAKER ASSOCIATED WITH SELECTED BRANCH CIRCUIT

[75] Inventors: Ronald A. Coia, North Riverside, Ill.; Joachim Wottrich, Hamburg-Norderstedt, Germany

[73] Assignee: Unique Technologies, LLC, La Grange Park, Ill.

[21] Appl. No.: 09/087,018

[22] Filed: May 29, 1998

[51] Int. Cl.[7] ............................ G01R 31/327; H02H 3/00
[52] U.S. Cl. .............................. 324/424; 324/520; 324/66
[58] Field of Search .................................. 324/424, 520, 324/537, 556, 133, 66; 340/638; 361/62

[56] References Cited

U.S. PATENT DOCUMENTS

| | | |
|---|---|---|
| 3,467,835 | 9/1969 | DeCola . |
| 3,739,259 | 6/1973 | May .......................................... 324/424 |
| 3,740,738 | 6/1973 | Kosanovich et al. ...................... 361/79 |
| 3,829,765 | 8/1974 | Siler . |
| 3,891,811 | 6/1975 | Miller . |
| 4,004,201 | 1/1977 | DePuy ...................................... 361/96 |
| 4,129,825 | 12/1978 | Brinegar . |
| 4,272,687 | 6/1981 | Borkan . |
| 4,358,810 | 11/1982 | Wafer et al. ........................ 340/638 X |
| 4,642,556 | 2/1987 | Pecukonis . |
| 4,734,638 | 3/1988 | Weber . |
| 4,801,868 | 1/1989 | Brooks . |
| 4,906,938 | 3/1990 | Konopka . |
| 5,109,200 | 4/1992 | Dushane et al. . |
| 5,233,330 | 8/1993 | Hase ........................................ 340/638 |
| 5,422,564 | 6/1995 | Earle et al. . |
| 5,493,206 | 2/1996 | Boons . |

OTHER PUBLICATIONS

Wottrich, "Self Identifying Circuit Breaker", p. 20, date unknown.

*Primary Examiner*—Glenn W. Brown
*Attorney, Agent, or Firm*—Sonnenschein Nath & Rosenthal

[57] ABSTRACT

A system for locating the particular circuit breaker associated with a branch circuit. The system includes a transmitter is connected to the hot lead of the branch circuit to inject a signal having a predetermined frequency. The system further includes identification circuits permanently associated with each circuit breaker. The identification circuit includes an indicator powered by a rectifier connected to the hot lead of the associated branch circuit. A band pass filter within the identification circuit passes the predetermined frequency, which when present biases the gate of a controlled switch which is placed in series with the indicator lamp such that when the predetermined frequency is present on the hot lead the indicator lamp is turned on. Each identification circuit may also include a low pass filter connected in series between the hot lead of the branch circuit and the bus so as to block the predetermined frequency signal from being distributed via the bus bar into the identifying circuits associated with other branch circuits. In one embodiment, the identification circuit and circuit breaker are enclosed within a single enclosure, which may further include a socket for simplified connection to at least the hot lead and bus bar.

20 Claims, 2 Drawing Sheets

ELECTRONIC CIRCUIT FOR IDENTIFYING CIRCUIT BREAKER ASSOCIATED WITH SELECTED BRANCH CIRCUIT

BACKGROUND OF THE DISCLOSURE

1. Field of the Invention

The present invention relates in general to electrical power distribution design, implementation and repair devices and, in particular, to a system and circuit for identifying which one of a group of circuit breakers is associated with a particular, selected branch circuit within a facility.

2. Background Art

When electrical work needs to be performed on an electrical system in a building or facility, it is usually necessary to trace and identify which circuit interrupter device (i.e., circuit breaker or fuse) is supplying power to a specific AC power branch circuit.

Manual identification of the fuse or circuit breaker can be accomplished by removing each fuse or opening each circuit breaker, thereby disrupting the power flow through the circuit. Each test point must subsequently be examined to determine whether the power to the test point has been disconnected. This method is not only time consuming, but also may not be feasible in situations where it would be hazardous to interrupt the power flow to certain branch circuit outlets, i.e., in a hospital or in environments where there are computers in use without backup power.

Alternatively there are currently available a number of circuit testers for identifying the circuit interrupting device that is supplying power to a specific outlet receptacle. These testers employ a variety of techniques to differentiate one circuit breaker from the rest. All of these pre-existing devices have at least one thing in common, they all consist of two separate units, a identification signal generator (referred to as a transmitter) and a signal receiver, which inject and then receive this signal over the AC wiring.

Consequently, it is an object of the present invention to provide a circuit location device that is simpler to couple to one of a plurality of branch circuits of a facility.

One pre-existing tester pair creates a magnetic field on the AC wiring and then detects that magnetic field proximate the circuit interrupter devices. Unfortunately, the magnetic fields created are easily coupled between AC wire lines, thus creating potentially false identification signals. Further, using magnetic fields as signal medium, in turn, necessitates the use of a radio frequency receiver for detection at the circuit interruptor devices box.

Accordingly, it is another object of the present invention to provide a device that provides more reliable identification of circuit selection. It is an associated object of the present invention to obviate the need for radio frequency receiver by eliminating the use of magnetic field identification. As a result, detection can be accomplished at significantly larger distances and with less error in noisier environments than with the magnetic field approach.

Depending upon the type of tester device used, the end user may also be required to calibrate for the sensitivity of the device either by manually adjusting same or by allowing for differences in sensitivity by independent observation of sensitivity data provided via a signal strength meter, bar graph display or other approach in order to properly identify the correct circuit interrupting device. Receivers with manual adjustment as well as those with analogue or digital readouts (signal strength meters) can be quite difficult to use especially if the end user has no prior experience with such instruments. Furthermore, since the strength of the identification signal is a function of permanently altering line impedance and capacitance, the amplitude of the identification signal varies. However, pre-existing receiving devices always detect the breaker in question by determining which breaker is reflecting the largest signal amplitude.

Accordingly, it is yet another object of the present invention to provide easier operation and time savings to an end user by eliminating the need for manual calibration and thereby also eliminating the potential for user error associated with same.

These and other objects will be apparent to those of ordinary skill in the art having the present drawings, specification and claims before them.

SUMMARY OF THE INVENTION

The present invention is directed to a system for locating the circuit breaker (or other similar circuit interrupter device) associated with a selected branch circuit from a group of circuit breakers (possibly contained within the same breaker panel). The system includes a transmitter and at least one identification circuit. The transmitter is connected to the hot lead of the branch circuit for which circuit breaker association is desired. The transmitter injects a signal having a predetermined frequency into the hot lead of the branch circuit. No particular design is required for the transmitter so long as it generates a signal at the predetermined frequency. In fact, the identification circuit can be used alone so long as a signal of predetermined frequency exists on the line for which circuit breaker location is desired.

An identification circuit is connected to a unique branch circuit and associated with each one of the circuit breakers from the group of circuit breakers. Each identification circuit includes an indicator lamp and preferably further includes a fuse to protect the components of the identification circuit. Operably connected to one side of the indicator lamp is a rectifier which draws power from the hot lead of the unique branch circuit. The identification circuit further includes a band pass filter with its input being operably connected to the hot lead of the unique branch circuit. The output of the band pass filter is connected to the gate of a controlled switch toward controlling same. In a preferred embodiment, this gate may be protected by a reverse bias protection circuit. The first and second terminals of the controlled switch are operably connected in series with the indicator lamp wherein upon receipt of the predetermined frequency signal on the hot lead of the unique branch circuit, the band pass filter output biases the gate causing current to flow through the controller switch and, in turn, the indicator lamp. In this way the target circuit breaker is identified via its association with the indicator lamp.

In a preferred embodiment of the present invention, each identification circuit further includes a low pass filter operably connected in series between the hot lead of the unique branch circuit and the bus bar and in parallel with other circuits in the identification circuit. The low pass filter substantially prevents the predetermined frequency signal injected in one particular branch circuit from bleeding into one or more of the other branch circuits connected to the same bus bar as the indicated circuit, thus, substantially precluding the possibility of false positives.

In a preferred embodiment of the present invention the identification circuit and circuit breaker are enclosed within a single enclosure. This enclosure may further include a socket which operably connects the enclosed identification circuit and circuit breaker to at least the hot lead and the bus bar and may further include an additional connector which connects the identification circuit to the neutral lead (alternatively the hot/bus bar socket may also connect to the neutral lead). Thus the circuit breaker manufacturer can install the identification circuit directly into the circuit breaker enclosure. Thus, from an end user's stand point, this process would be "single ended" (i.e. connection of transmitter only) and would not require any type of hand held receiver unit.

BEST MODE OF CARRYING OUT THE PRESENT INVENTION

Figure 1:
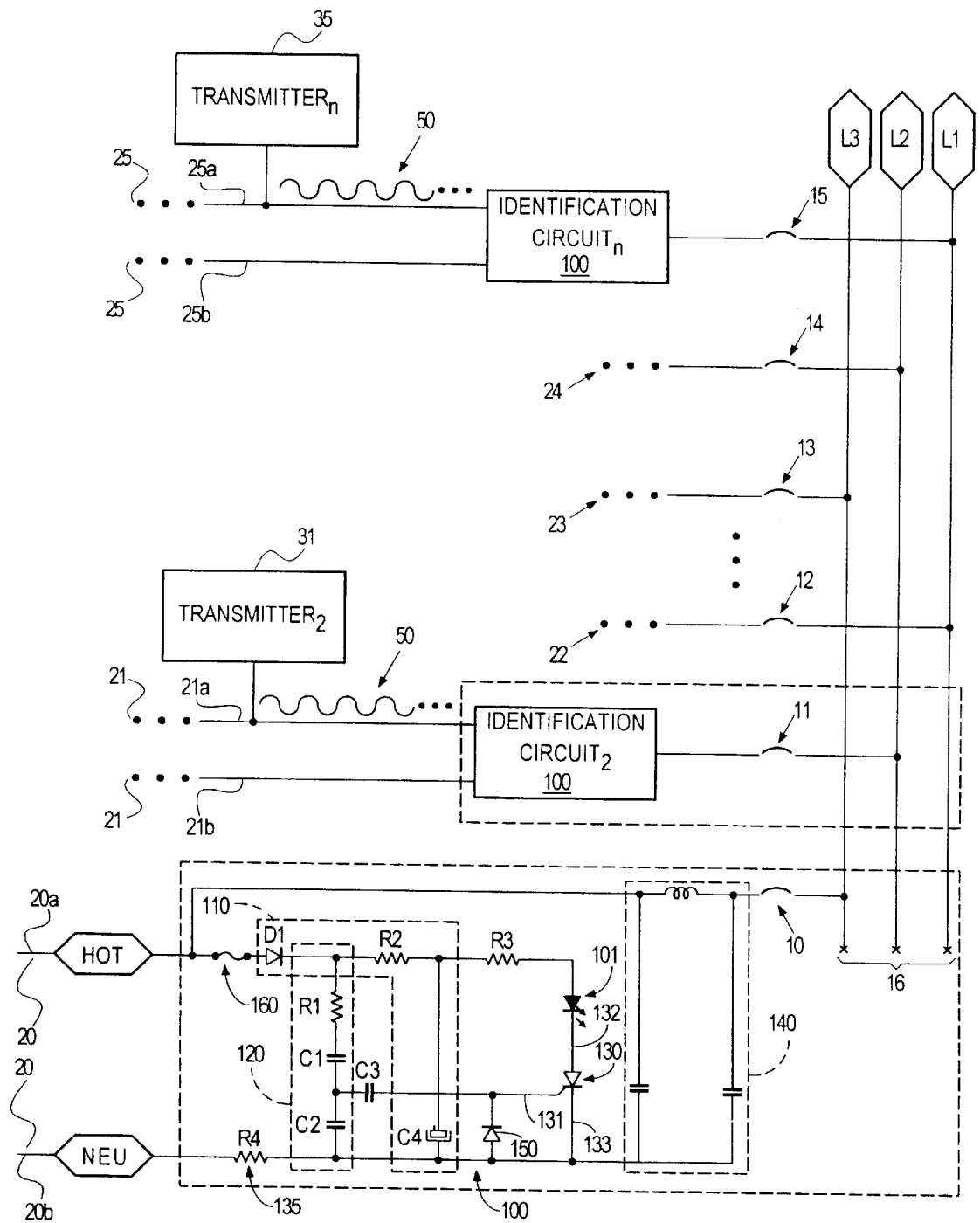
FIG. 1 of the drawings is a schematic block diagram illustrating the various components in a preferred embodiment of the present invention.

While the present invention may be embodied in many different forms, there is shown in the drawings and discussed herein a few specific embodiments with the understanding that the present disclosure is to be considered only as an exemplification of the principles of the invention and is not intended to limit the invention to the embodiments illustrated.

The system for locating the circuit breaker associated with a desired branch circuit from a group of circuit breakers is shown in FIG. 1 in association with a group of circuit breakers. As would be understood by those of ordinary skill in the art, the present system will operate in the manner disclosed herein in combination with any type of circuit interrupter device, which have been referred to generically as circuit breakers in the present application. In particular, circuit breakers 10, 11, 12, 13, 14 and 15 within a group of circuit breakers are operably connected in series between an associated unique branch circuit 20, 21, 22, 23, 24 and 25, respectively, and bus bar 16 to provide overload protection to each respective unique branch circuit. Branch circuits 20, 21 and 25 are shown as having associated therewith hot leads 20a, 21a and 25a, respectively, and neutral leads 20b, 21b and 25b, respectively. Each branch circuit includes a hot lead and a neutral lead. Some are not shown, however, merely to simplify disclosure of the present invention without obscuring same.

As further shown in FIG. 1, the system also includes transmitters 31 and 35 (other transmitters are not shown to simplify disclosure of the present invention without obscuring same). Of course, as would be understood by those of ordinary skill in the art, any number of transmitters (from one up to the numbers of circuit breakers) may be used without departing from the scope of the present invention. It is contemplated that the transmitters will be removably connected to a branch circuit via standard electrical outlets or some other means of simple removable connection. As shown, the transmitters are operably connected to the hot lead of a desired branch circuit, such that the transmitter can actively inject a signal 50 having a predetermined frequency. This predetermined frequency should generally be in the range of 300 kHz to 500 kHz because there are several other types of signals which may be present within an AC wiring system. For instance, electrical noise may be introduced by the weather or by electrical devices on one of the branch circuits.

As further shown in FIG. 1, the system may include one or more identification circuits 100, wherein each identification circuit is associated with a particular circuit breaker such as circuit breaker 10. As shown, identification circuit 100 includes indicator lamp 101, rectifier 110, band pass filter 120, controlled switch 130, current-limiting resistor 135, low pass filter 140, reverse bias protection diode 150, and fuse 160. With these elements, a predetermined frequency signal received on hot lead 20a of branch circuit 20 is passed by band pass filter 120, the output of which biases controlled switch 130 causing current to flow there through and, in turn, through indicator lamp 101. In this manner, the particular circuit breaker associated with a branch circuit is identified.

In particular, indicator lamp 101 preferably comprises an LED having first and second terminals wherein indicator lamp 101 illuminates when current flows between its terminals. Other types of lighting elements which illuminate when current flows therethrough and operate with the available voltage can be readily substituted for the preferred LED device. Of course, low power consuming devices are preferred.

Rectifier 110 is operably connected between hot lead 20a of branch circuit 20 and the first terminal of indicator lamp 101. As disclosed, rectifier 110 preferably comprises a simple half wave rectifier circuit comprising—in the particularly disclosed embodiment—diode D1, resistor R2 and capacitor C4. Simpler half-wave circuits (comprising even just a diode) could similarly be utilized within the present disclosure. It is also contemplated that rectifier 110 could even be constructed as a full-wave rectifier. It should be noted that the present design is such that identification circuit 100 could be operated solely from the power provided by the predetermined frequency signal. Such operation is highly desirable in a facility during wiring but prior to electrical hook-up. As shown, identification circuit 100 may further comprise fuse 160 operably connected in series between the hot lead and the rectifier to provide overcurrent protection to identification circuit 100.

Band pass filter 120 comprises—in the particularly disclosed embodiment—resistor R1, capacitor C1 and capacitor C2. As such, the input to band pass filter 120 is at the connection between the cathode of diode D1 and the first terminal of R1. In this manner, the input of the band pass filter is operably connected to the hot lead of the associated branch circuit. It should be noted that identification circuit 100 would operate if the band pass filter input were connected to the anode of diode D1 rather than its cathode. However, it has been found that diode D1 provides desirable noise rejection which improves the operation of band pass filter 120 and potentially simplifies the design of that filter when the input is taken from the diode's cathode. The output of band pass filter 120 is drawn at the tap between capacitors C1 and C2. As is known, the values for R1, C1 and C2 are selected such that band pass filter 120 passes the predetermined frequency from its input to its output while substantially blocking all other frequencies.

Controlled switch 130 has gate 131, first terminal 132 and second terminal 133 wherein current flows between the first and second terminals and through the controlled switch upon application of appropriate bias to the gate. Accordingly, although controlled switch 130 preferably comprises a SCR it could comprise a Triac or other similarly operated gate-controlled switching device. As shown, first terminal 132 is in series with the indicator lamp and second terminal 133 is connected to neutral lead 20b of branch circuit 20. Gate 131 is operably connected to the output of band pass filter 120.

In a preferred embodiment, capacitor C3 is interposed between gate 131 and the output of the band pass filter and selected such that C3 substantially blocks any harmonic frequency noise from reaching the gate to prevent inadvertent triggering. Also connected to this circuit is second diode 150, which provides reverse bias protection for the gate of the controlled switch.

In a preferred embodiment of the present invention, identification circuit further includes low pass filter 140, which is operably connected in series between hot lead 20a of branch circuit 20 and bus bar 16 and in parallel with other circuits in said identification circuit.

In a preferred embodiment, identification circuit 100 is manufactured such that it is contained in the same enclosure as its associated circuit breaker so as to provide for ease of installation. This enclosure may further include a socket which operably connects the enclosed identification circuit and circuit breaker to at least the associated hot lead and bus bar terminals. A further removably connectable lead may be used to connect to the neutral lead (or alternatively the socket may also include a connection to the neutral lead in addition to the hot lead/bus bar connections).

In operation, an end user connects (usually a standard branch receptacle) transmitter 31 to hot lead 21a of branch circuit 21. Then the end user or another user assisting the end user merely visually scans the breaker panel looking for the particular indicator lamp that lights to correctly identify the circuit breaker protecting selected branch circuit 21. Of course, a similar procedure could be conducted for each branch circuit and circuit breaker within the group of circuit breakers.

As shown in FIG. 1, transmitters 31 and 35 are directly coupled to a particular hot lead of a particular branch circuit, thus injecting a predetermined frequency signal into the hot lead. It should be emphasized that any circuit that can inject (or directly couple) a signal at the predetermined frequency onto the hot lead of a branch circuit can be used as the transmitter in the present invention.

Figure 2:
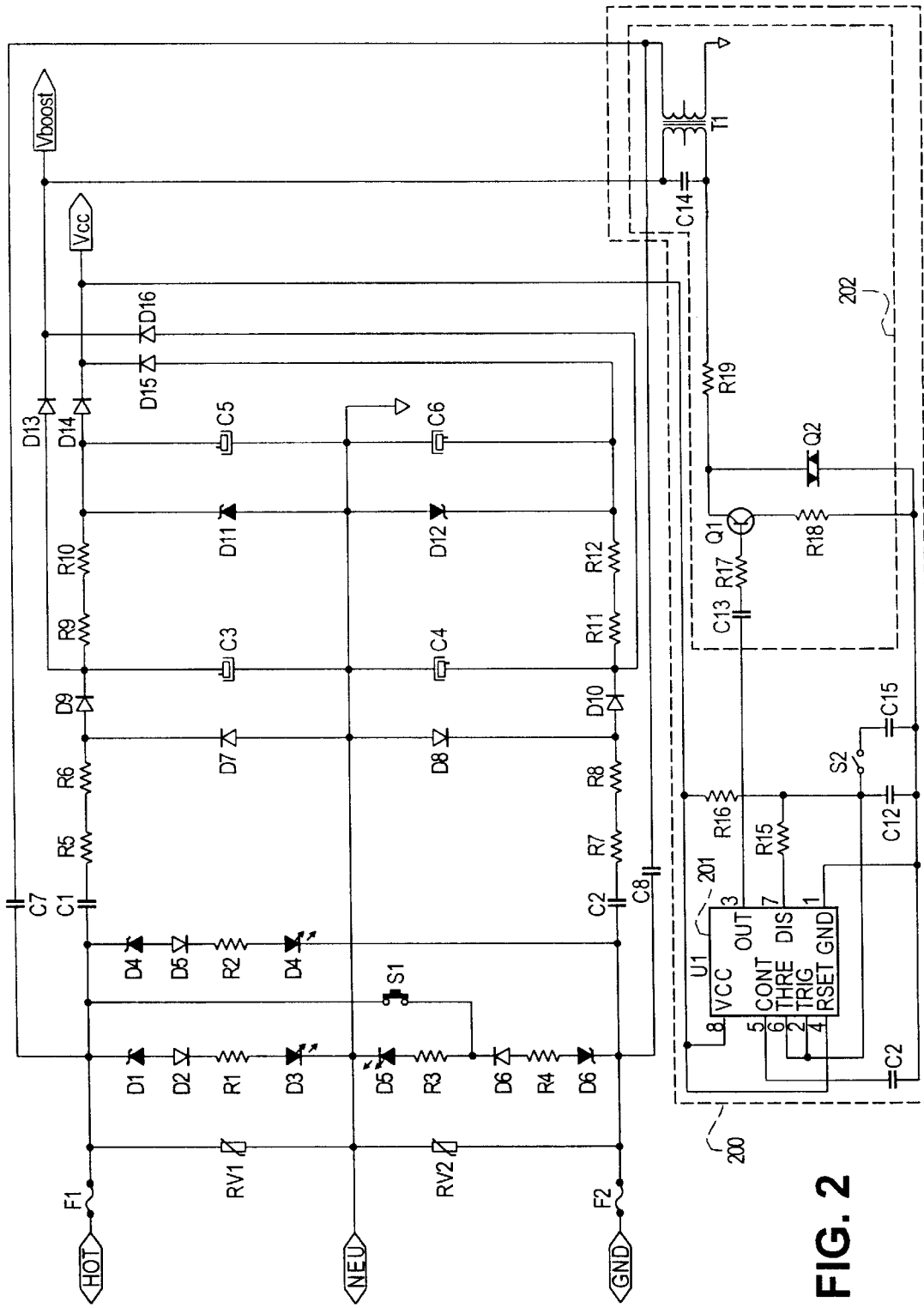
FIG. 2 of the drawings is a schematic diagram of one particular transmitter which can be used in conjunction with the present invention.

FIG. 2 shows one potential embodiment of the transmitters for use in the present invention. In particular, this transmitter, in addition to having frequency generator circuit 200 also includes receptacle analyzer circuitry and ground fault condition tester circuit, as well. Frequency generator circuit 200 includes timer circuit 201, resistor R15, resistor R16, capacitor C12, capacitor C15, switch S2, and booster/isolation circuit 202. Generally, resistors R15 and R16 and capacitor C12 are the frequency determining components for timer circuit 201. Additionally, though, by closing switch S2, capacitor C15 further determines the frequency by increasing the capacitance in the frequency determinative branch, in turn lowering the frequency of the resulting output signal. Accordingly, this particular transmitter is capable of generating one of two frequencies depending on the position of switch S2. The default frequency (generated with S2 open) is the standard predetermined frequency discussed throughout the present disclosure. The second, lower frequency (generated with S1 closed), would be used to pass through low pass filter 140 and onto the particularly connected phase of bus bar 16 such that an end user could identify all circuit breakers within the group of circuit breakers that are on the same phase. Of course, in such a design the band pass filter of 120 would be designed with sufficient bandwidth to pass both signal frequencies.

The foregoing description and drawings merely explain and illustrate the invention and the invention is not limited thereto. Those of the skill in the art who have the disclosure before them will be able to make modifications and variations therein without departing from the scope of the present invention.

What is claimed is:

1. An identification circuit for indicating selection of a branch circuit associated with a particular circuit breaker said circuit breaker, operably connected in series between a bus bar and a hot lead of said branch circuit to provide overload protection to said branch circuit, said identification circuit comprising:

an indicator lamp having first and second terminals, said indicator lamp illuminating upon current flowing between said first and second terminals of said indicator lamp;

a rectifier operably connected between said hot lead and said first terminal of said indicator lamp;

a band pass filter having an input and an output, said band pass filter input being operably connected to said hot lead, said band pass filter being constructed to pass a predetermined frequency from said input to said output while substantially blocking all other frequencies; and a controlled switch having a gate, a first terminal and a second terminal wherein current flows between said first and second terminals and through said controlled switch upon application of appropriate biasing to said gate, said first and second terminals being operably connected in series with said indicator lamp, and said gate being operably connected to said output of said band pass filter, whereby upon receipt of a signal having said predetermined frequency on said hot lead, said band pass filter output biases said gate causing current to flow through said controlled switch and, in turn, said indicator lamp, thus identifying that said circuit breaker, associated with said indicator lamp, is operably connected to said branch circuit into which a signal at said predetermined frequency has been injected.

2. The invention according to claim 1 further comprising a low pass filter operably connected in series between said bus bar and said hot lead and in parallel with other circuits in said identification circuit.

3. The invention according to claim 2 further comprising a reverse bias protection circuit operably connected to said gate of said controlled switch.

4. The invention according to claim 3 further comprising a fuse operably connected in series between said hot lead and said rectifier.

5. The invention according to claim 4 wherein said identification circuit and said circuit breaker are enclosed within a single enclosure.

6. The invention according to claim 5 wherein said single enclosure includes a socket which operably connects said enclosed identification circuit and circuit breaker to at least said hot lead and said bus bar.

7. The invention according to claim 1 further comprising a reverse bias protection circuit operably connected to said gate of said controlled switch.

8. The invention according to claim 1 further comprising a fuse operably connected in series between said hot lead and said rectifier.

9. The invention according to claim 1 wherein said identification circuit and said circuit breaker are enclosed within a single enclosure.

10. The invention according to claim 9 wherein said single enclosure includes a socket which operably connects said enclosed identification circuit and circuit breaker to at least said hot lead and said bus bar.

11. A system for locating a circuit breaker associated with a desired branch circuit from a group of circuit breakers, each circuit breaker within said group of circuit breakers being operably connected in series between a unique branch circuit and a bus bar to provide overload protection to said unique branch circuit, each unique branch circuit having associated therewith a hot lead and a neutral lead, said, unique branch circuits including said desired circuit, said system comprising:

a transmitter operably and removably connected to said hot lead of said desired branch circuit, said transmitter injecting a signal having a predetermined frequency; and a plurality of identification circuits, each of said plurality of identification circuits being associated with a particular one of said circuit breakers from said group of circuit breakers, said identification circuit including:

an indicator lamp having first and second terminals, said indicator lamp illuminating upon current flowing between said first and second terminals of said indicator lamp, a rectifier operably connected between said hot lead of said unique branch circuit and said first terminal of said indicator lamp, a band pass filter having an input and an output, said band pass filter input being operably connected to said hot lead of said unique branch circuit, said band pass filter being constructed to pass said predetermined frequency from said input to said output while substantially blocking all other frequencies, a controlled switch having a gate, a first terminal and a second terminal wherein current flows between said first and second terminals and through said controlled switch upon application of appropriate biasing to said gate, said first and second terminals being operably connected in series with said indicator lamp, and said gate being operably connected to said output of said band pass filter, whereby upon receipt of a signal having said predetermined frequency on said hot lead, said band pass filter output biases said gate causing current to flow through said controller switch and, in turn, said indicator lamp, thus identifying that said circuit breaker, associated with said indicator lamp, is operably connected to said branch circuit into which a signal at said predetermined frequency has been injected.

12. The invention according to claim 11 wherein each of said plurality of identification circuits further includes a low pass filter operably connected in series between said hot lead of said unique branch circuit and said bus bar and in parallel with other circuits in said identification circuit.

13. The invention according to claim 12 further comprising a reverse bias protection circuit operably connected to said gate of said controlled switch.

14. The invention according to claim 13 further comprising a fuse operably connected in series between said hot lead and said rectifier.

15. The invention according to claim 14 wherein said identification circuit and said circuit breaker are enclosed within a single enclosure.

16. The invention according to claim 15 wherein said single enclosure includes a socket which operably connects said enclosed identification circuit and circuit breaker to at least said hot lead and said bus bar.

17. The invention according to claim 11 further comprising a reverse bias protection circuit operably connected to said gate of said controlled switch.

18. The invention according to claim 11 further comprising a fuse operably connected in series between said hot lead and said rectifier.

19. The invention according to claim 11 wherein said identification circuit and said circuit breaker are enclosed within a single enclosure.

20. The invention according to claim 19 wherein said single enclosure includes a socket which operably connects said enclosed identification circuit and circuit breaker to at least said hot lead and said bus bar.

* * * * *